US011913636B1

(12) United States Patent
Chen et al.

(10) Patent No.: US 11,913,636 B1
(45) Date of Patent: Feb. 27, 2024

(54) LIGHT SOURCE MODULE

(71) Applicant: AUO Corporation, Hsinchu (TW)

(72) Inventors: Hui-Chuan Chen, Hsinchu (TW); Chia-Hao Wu, Hsinchu (TW)

(73) Assignee: AUO Corporation, Hsinchu (TW)

(*) Notice: Subject to any disclaimer, the term of this patent is extended or adjusted under 35 U.S.C. 154(b) by 0 days.

(21) Appl. No.: 18/084,555

(22) Filed: Dec. 20, 2022

(30) Foreign Application Priority Data

Aug. 19, 2022 (TW) .................................. 111131369

(51) Int. Cl.
*F21V 7/00* (2006.01)
*G02B 5/02* (2006.01)
*F21Y 115/10* (2016.01)
*F21Y 105/12* (2016.01)

(52) U.S. Cl.
CPC .......... *F21V 7/0016* (2013.01); *G02B 5/0242* (2013.01); *F21Y 2105/12* (2016.08); *F21Y 2115/10* (2016.08)

(58) Field of Classification Search
CPC . F21V 7/0016; G02B 5/0242; F21Y 2105/12; F21Y 2115/10
See application file for complete search history.

(56) References Cited

U.S. PATENT DOCUMENTS 8,403,511 B2 3/2013 Bae et al.
8,672,498 B2 3/2014 Bae et al.
8,933,871 B2 1/2015 Park et al.
9,140,929 B2 9/2015 Bae et al.
10,852,467 B2 12/2020 Watanabe et al.
11,043,620 B2 6/2021 Yamamoto et al.
11,211,532 B2 12/2021 Yamamoto et al.
11,256,017 B2 2/2022 Watanabe et al.
2011/0050556 A1 3/2011 Bae et al.
2011/0050735 A1 3/2011 Bae et al.
2011/0051397 A1 3/2011 Bae et al.
2011/0069496 A1* 3/2011 Ing .......................... F21V 5/007 362/311.03
2018/0182940 A1 6/2018 Yamamoto et al.
2020/0049877 A1 2/2020 Watanabe et al.
2020/0135993 A1 4/2020 Yamamoto et al.
2021/0041617 A1 2/2021 Watanabe et al.
2022/0146734 A1 5/2022 Watanabe et al.

FOREIGN PATENT DOCUMENTS

CN 102483538 4/2016
CN 108242442 7/2018
CN 112902111 7/2022
TW 200811532 3/2008
TW I653477 3/2019

* cited by examiner

*Primary Examiner* — Jia X Pan
*Assistant Examiner* — Jessica M Apenteng
(74) *Attorney, Agent, or Firm* — JCIPRNET

(57) ABSTRACT

A light source module includes a circuit substrate, a plurality of light-emitting diodes, a cover layer and a plurality of first scattering particles. The plurality of light-emitting diodes is disposed on the circuit substrate. The cover layer covers the plurality of light-emitting diodes, and an upper surface of the cover layer has a plurality of recesses, wherein orthogonal projections of the plurality of recesses on the circuit substrate overlap the circuit substrate between the plurality of light-emitting diodes. The plurality of first scattering particles is located in the plurality of recesses.

20 Claims, 11 Drawing Sheets

LIGHT SOURCE MODULE

CROSS-REFERENCE TO RELATED APPLICATION

This application claims the priority benefit of Taiwan application serial no. 111131369 filed on Aug. 19, 2022. The entirety of the above-mentioned patent application is hereby incorporated by reference herein and made a part of this specification.

BACKGROUND

Technical Field

The disclosure relates to a light source module.

Description of Related Art

As the dimension of light-emitting diodes decreases, the number of light-emitting diodes used in the light source module also increases. In order to reduce the cost, the current practice is to reduce the number of light-emitting diodes used by increasing the spacing between the light-emitting diodes. However, due to the increase in the spacing between the light-emitting diodes, there is an obvious brightness difference between the areas directly above and not directly above the light-emitting diodes, resulting in poor light emission uniformity of the light source module.

SUMMARY

The disclosure provides a light source module having improved light emission uniformity.

An embodiment of the disclosure provides a light source module, including: a circuit substrate; multiple light-emitting elements disposed on the circuit substrate; a cover layer covering the light-emitting elements, and an upper surface of the cover layer having multiple recesses, in which orthographic projections of the recesses on the circuit substrate overlap the circuit substrate between the light-emitting elements; and multiple first scattering particles located in the recesses.

In an embodiment of the disclosure, a particle diameter distribution of the first scattering particles is proportional to a spacing between orthographic projections of the first scattering particles on the circuit substrate and orthographic projections of the light-emitting elements on the circuit substrate.

In an embodiment of the disclosure, a distribution density of the first scattering particles is proportional to a spacing between orthographic projections of the first scattering particles on the circuit substrate and orthographic projections of the light-emitting elements on the circuit substrate.

In an embodiment of the disclosure, the orthographic projections of the recesses on the circuit substrate partially overlap the orthographic projections of the light-emitting elements on the circuit substrate.

In an embodiment of the disclosure, the orthographic projections of at least two of the recesses on the circuit substrate overlap the circuit substrate between adjacent light-emitting elements.

In an embodiment of the disclosure, depths of the at least two recesses are respectively proportional to a spacing between the at least two recesses and the orthographic projections of the light-emitting elements on the circuit substrate.

In an embodiment of the disclosure, the light source module further includes reflective particles located in the recesses.

In an embodiment of the disclosure, light transmittance of the first scattering particles is greater than light transmittance of the reflective particles.

In an embodiment of the disclosure, a distribution density of the reflective particles is inversely proportional to a spacing between orthographic projections of the reflective particles on the circuit substrate and orthographic projections of the light-emitting elements on the circuit substrate.

In an embodiment of the disclosure, the recesses further respectively have multiple recessed holes.

In an embodiment of the disclosure, the first scattering particles are located in the recessed holes.

In an embodiment of the disclosure, the light source module further includes reflective particles located in multiple recessed holes.

In an embodiment of the disclosure, a depth of the recesses is 10% to 100% of a height of the cover layer.

In an embodiment of the disclosure, a maximum width of the recesses is 10% to 140% of a spacing between the light-emitting elements.

In an embodiment of the disclosure, the above light source module further includes auxiliary particles located on the circuit substrate between the light-emitting elements.

In an embodiment of the disclosure, the cover layer further has multiple protrusions located between the recesses, and orthographic projections of the protrusions on the circuit substrate respectively overlap the orthographic projections of the light-emitting elements on the circuit substrate.

In an embodiment of the disclosure, the light source module further includes reflective particles located on the protrusions.

In an embodiment of the disclosure, cross-sectional shapes of a first recess and a second recess of the recesses are different.

In an embodiment of the disclosure, the recesses have cross-sectional shapes that are arc-shaped, U-shaped, V-shaped, trapezoidal, rectangular, or stepped.

In an embodiment of the disclosure, the recesses have top view shapes that are ring-shaped or grid-shaped.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
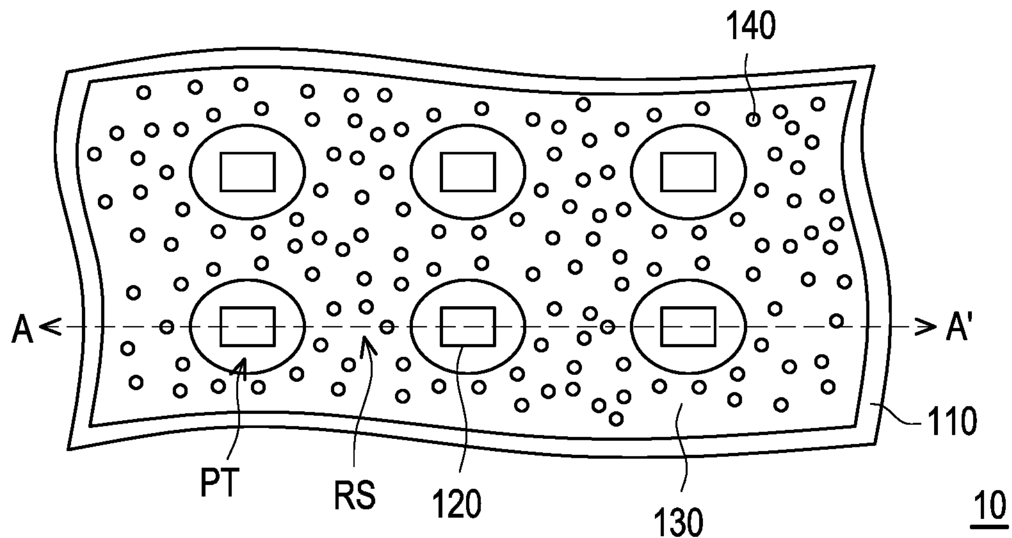
FIG. 1A is a partial top schematic view of a light source module 10 according to an embodiment of the disclosure.

In the drawings, for clarity, the thickness of layers, films, plates, areas, and the like are magnified. Throughout the specification, the same reference numerals denote the same elements. It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "to electrically connect" or "to couple" may also be used when other elements exist between two elements.

It should be understood that, although the terms "first", "second", "third", or the like may be used herein to describe various elements, components, regions, layers, and/or portions, these elements, components, regions, and/or portions should not be limited by these terms. These terms are only used to distinguish one element, component, region, layer, or portion from another element, component, region, layer, or portion. Thus, a first "element," "component," "region," "layer," or "portion" discussed below may be referred to as a second element, component, region, layer, or portion without departing from the teachings herein.

The terminology used herein is for the purpose of describing particular embodiments only and is not limiting. As used herein, the singular forms "a", "an", and "the" are intended to include the plural forms including "at least one" or represent "and/or" unless the content clearly dictates otherwise. As used herein, the term "and/or" includes any and all combinations of one or more of the associated listed items. It should also be understood that, when used in this specification, the term "including" or "includes" specify a presence of the stated feature, region, whole subject, step, operation, element, and/or part, but not excluding the presence or addition of one or more other features, regions, whole subjects, steps, operations, elements, parts, and/or a combination thereof.

Moreover, relative terms such as "below" or "bottom" and "above" or "top" may serve to describe the relation between one element and another element in the text according to the illustration of the drawings. It should also be understood that the relative terms are intended to include different orientations of a device in addition to the orientation shown in the drawings. For example, if a device in the accompanying drawings is flipped, an element described as being on the "lower" side of other elements shall be re-orientated to be on the "upper" side of other elements. Thus, the exemplary term "lower" may cover the orientations of "upper" and "lower", depending on the specific orientations of the accompanying drawings. Similarly, if a device in the accompanying drawings is flipped, an element described as being "below" or "beneath "other elements shall be re-orientated to be "above" other elements. Thus, the exemplary terms "below" or "beneath" can encompass both an orientation of above and below.

Considering the discussed measurement and measurement-related deviation (that is, the limitation of measurement system), the usages of "approximately", "similar to" or "substantially" indicated throughout the specification include the indicated value and an average value having an acceptable deviation range, which is a certain value confirmed by people skilled in the art. For example, "approximately" may indicate to be within one or more standard deviations of the indicated value, or being within ±30%, ±20%, ±10%, or ±5%. Furthermore, the usages of "approximately", "similar to", or "substantially" indicated throughout the specification may refer to a more acceptable deviation scope or standard deviation depending on optical properties, etching properties, or other properties, and all properties may not be applied with one standard deviation.

Unless otherwise defined, all terms (including technical and scientific terms) used herein have the same meaning as that commonly understood by one of ordinary skill in the art to which this disclosure belongs. It should be further understood that terms such as those defined in commonly used dictionaries should be construed as having meanings consistent with their meanings in the context of the related art and the disclosure, and are not to be construed as idealized or excessive formal meaning, unless expressly defined as such herein.

Exemplary embodiments are described with cross-sectional views of schematic illustrations of ideal embodiments. Thus, shape alterations as a result of, for example, manufacturing techniques and/or tolerances can be expected, and the illustrated regions of the embodiments described herein should not be construed to particular shapes but include shape deviations due to, for example, manufacturing. For example, regions shown or described as being flat may generally have rough and/or non-linear features. Furthermore, the acute angles shown may be round. Therefore, the regions illustrated in the drawings are only schematic representations and are not intended to illustrate the exact shapes of the regions or to limit the scope of the claims.

Figure 1B:
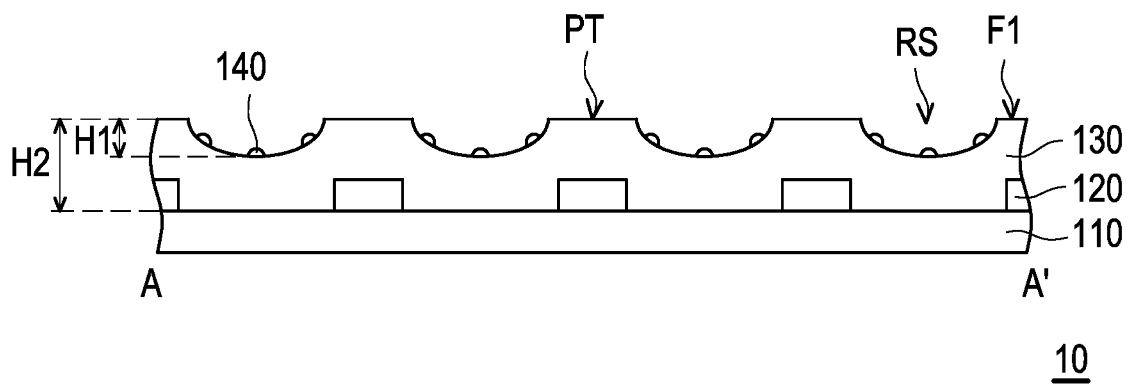
FIG. 1B is a cross-sectional schematic view along a section line A-A' of FIG. 1A.

FIG. 1A is a partial top schematic view of a light source module 10 according to an embodiment of the disclosure. FIG. 1B is a cross-sectional schematic view along a section line A-A' of FIG. 1A. Referring to FIG. 1A and FIG. 1B at the same time, a light source module 10 includes: a circuit substrate 110; multiple light-emitting elements 120 disposed on the circuit substrate 110; a cover layer 130 covering the light-emitting elements 120, and an upper surface F1 of the cover layer 130 having multiple recesses RS, in which orthographic projections of the recesses RS on the circuit substrate 110 overlap the circuit substrate 110 between the light-emitting elements 120; and multiple first scattering particles 140 located in the recesses RS.

In the light source module 10 according to an embodiment of the disclosure, the light output distribution of the light source module 10 is adjusted by the recesses RS and the first scattering particles 140 in the recesses RS, which may improve the light emission uniformity of the light source module 10.

Hereinafter, with reference to FIG. 1A to FIG. 1B, the implementation of each of the elements of the light source module 10 will be continued to be described, but the disclosure is not limited thereto. In addition, the light source module 10 may be a direct light source module or an edge light source module.

In this embodiment, the circuit substrate 110 may be a transparent substrate or a non-transparent substrate, and its material may be a polymer substrate, an alloy substrate, or other suitable materials, but the disclosure is not limited thereto. In some embodiments, the circuit substrate 110 may include elements or circuits required by the light source module 10, such as microcontroller chips, switching elements, power lines, detection signal lines, ground lines and so on.

The light-emitting element 120 may be electrically connected to the circuit substrate 110. For example, the light-emitting element 120 may be turned on or turned off by receiving a signal from the microcontroller chip on the circuit substrate 110. The light-emitting element 120 may be a light-emitting diode (LED), such as a mini light-emitting diode (mini-LED), a micro light-emitting diode (micro-LED), or other types of light-emitting diodes, but the disclosure is not limited thereto. In some embodiments, the light-emitting elements 120 may be arranged in an array on the circuit substrate 110, but the disclosure is not limited thereto. In some embodiments, the light-emitting elements 120 may be arranged on the circuit substrate 110 in other regular or irregular ways.

The cover layer 130 may be formed on the light-emitting elements 120 and the circuit substrate 110, and the cover layer 130 may completely cover the light-emitting elements 120 and the surface of the circuit substrate 110 not covered by the light-emitting elements 120 between the light-emitting elements 120. The material of the cover layer 130 may include resin, such as silicone, epoxy, acrylic, polycarbonate (PC), etc., but the disclosure is not limited thereto.

In this embodiment, the recess RS may be a groove formed by recessing from the upper surface F1 of the cover layer 130, and the orthographic projections of the recesses RS on the circuit substrate 110 may be outside the orthographic projections of the light-emitting elements 120 on the circuit substrate 110. In some embodiments, the depth H1 of the recess RS may be 10% to 100% of the height H2 of the cover layer 130, such as 20%, 50%, or 90%, but the disclosure is not limited thereto. Since the spacing between the recess RS formed after the upper surface F1 is recessed and the circuit substrate 110 is smaller than the spacing between the upper surface F1 and the circuit substrate 110, the light output from the light source module 10 in the recess RS may be increased.

In this embodiment, the recess RS has a cross-sectional shape that is arc-shaped, but the disclosure is not limited thereto. In some embodiments, the recess RS may have other suitable cross-sectional shapes, such as U-shaped, V-shaped, trapezoidal, rectangular, or stepped. In some embodiments, adjacent recesses RS are not connected to each other. In some embodiments, adjacent recesses RS may connect with each other.

Relative to the recessed profile of the recess RS, there may be multiple protrusions PT between the recesses RS, and the orthographic projections of the protrusions PT on the circuit substrate 110 may respectively overlap the orthographic projections of the light-emitting elements 120 on the circuit substrate 110. In this embodiment, the surface of the protrusion PT is the upper surface F1 of the cover layer 130, the protrusion PT has a substantially flat surface, and the protrusion PT has a top view shape that is elliptical, but the disclosure is not limited thereto. In some embodiments, the protrusion PT may have other suitable top view shapes, such as circular, polygonal, or star-shaped. In some embodiments, the surface of the protrusion PT may not be flat, and the protrusion PT may also have other suitable cross-sectional shapes.

In this embodiment, the first scattering particles 140 may have a uniform particle diameter, and the first scattering particles 140 may be uniformly disposed in the recesses RS. The material of the first scattering particles 140 may include organic polymer light-transmitting materials or inorganic light-transmitting materials, such as polyvinyl chloride (PVC), polycarbonate (PC), polyethylene (PE), silicon oxide ($SiO_2$) or titanium dioxide ($TiO_2$), etc., but not limited thereto. The first scattering particles 140 may change the light output path of the light-emitting element 120, thereby improving the light emission uniformity of the light source module 10.

Hereinafter, other embodiments of the disclosure will be described with reference to FIG. 2A to FIG. 15, and the reference numbers and related contents of the embodiments of FIG. 1A to FIG. 1B will be used. The same or similar reference numerals are used to denote the same or similar elements, and the description of the same technical content is omitted. For the description of the omitted part, reference may be made to the embodiments of FIG. 1A to FIG. 1B, which will not be repeated in the following description.

Figure 2A:
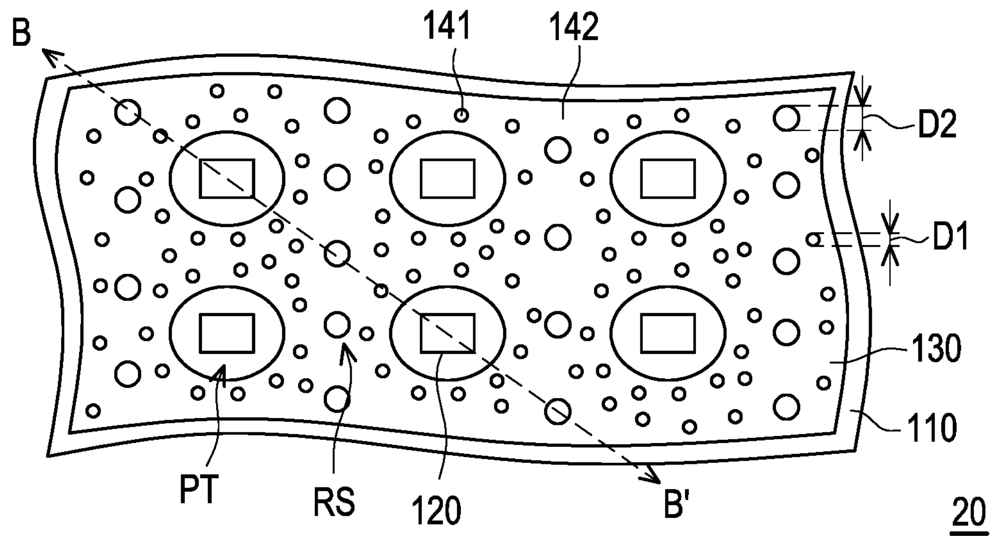
FIG. 2A is a partial top schematic view of a light source module 20 according to an embodiment of the disclosure.
Figure 2B:
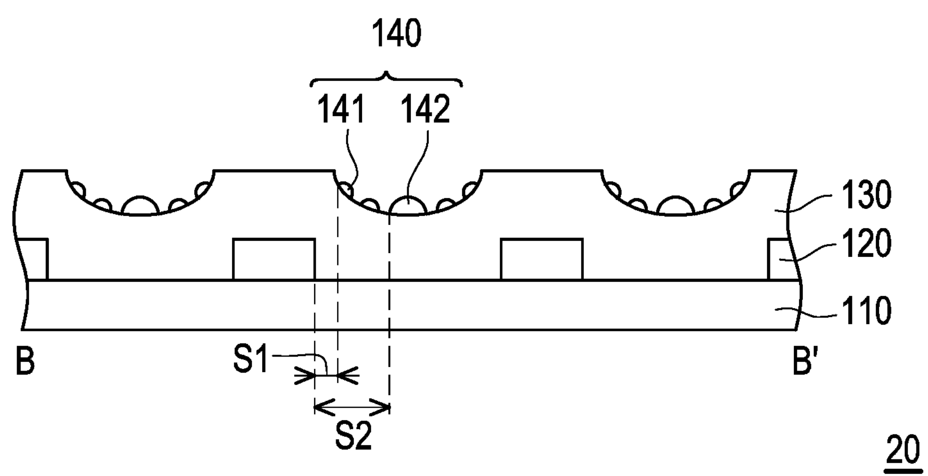
FIG. 2B is a cross-sectional schematic view along a section line B-B' of FIG. 2A.

FIG. 2A is a partial top schematic view of a light source module 20 according to an embodiment of the disclosure. FIG. 2B is a cross-sectional schematic view along a section line B-B' of FIG. 2A. Referring to FIG. 2A and FIG. 2B at the same time, the light source module includes: a circuit substrate 110, multiple light-emitting elements 120, a cover layer 130, and first scattering particles 140. The cover layer 130 has multiple recesses RS, and the first scattering particles 140 are located in the recesses RS.

Compared with the light source module 10 shown in FIG. 1A to FIG. 1B, the difference with the light source module 20 shown in FIG. 2A and FIG. 2B mainly lies in: the particle diameter distribution of the first scattering particles 140 of the light source module 20 is proportional to the spacing between the orthographic projections of the first scattering particles 140 on the circuit substrate 110 and the orthographic projections of the light emitting elements 120 on the circuit substrate 110.

For example, in this embodiment, the first scattering particles 140 may include scattering particles 141 and scattering particles 142, the particle diameter D1 of the scattering particles 141 is less than the particle diameter D2 of the scattering particles 142, and the spacing S1 between the orthographic projections of the scattering particles 141 on the circuit substrate 110 and the orthographic projections of the light-emitting elements 120 on the circuit substrate 110 is less than the spacing S2 between the orthographic projections of the scattering particles 142 on the circuit substrate 110 and the orthographic projections of the light-emitting element 120 on the circuit substrate 110. That is to say, the scattering particles 142 having a greater horizontal spacing from the light-emitting elements 120 may have a greater particle diameter. Since the scattering particles 142 with a larger particle diameter have an enhanced light output effect, the light output of the light source module 20 at a place farther horizontally from the light-emitting element 120 may be further increased.

Figure 3A:
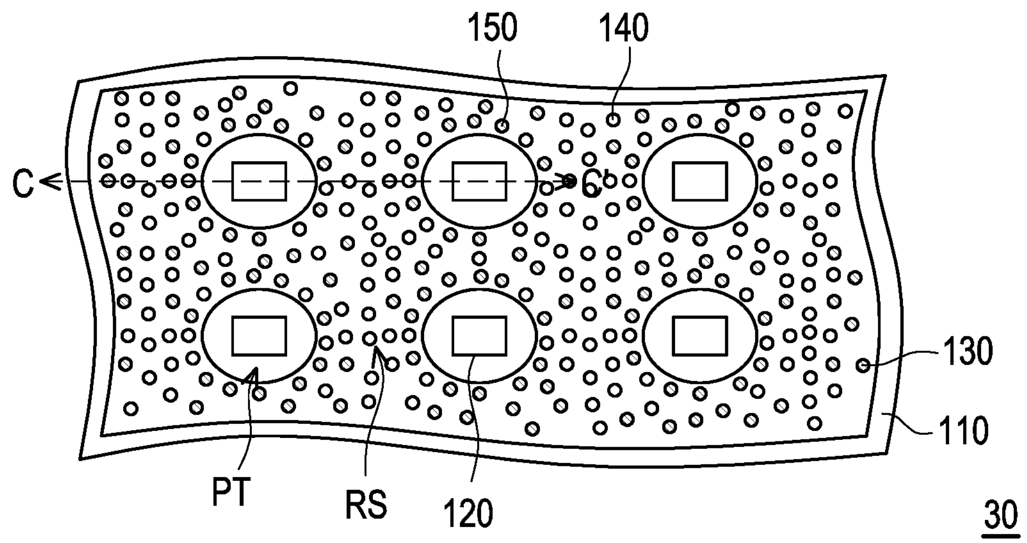
FIG. 3A is a partial top schematic view of a light source module 30 according to an embodiment of the disclosure.
Figure 3B:
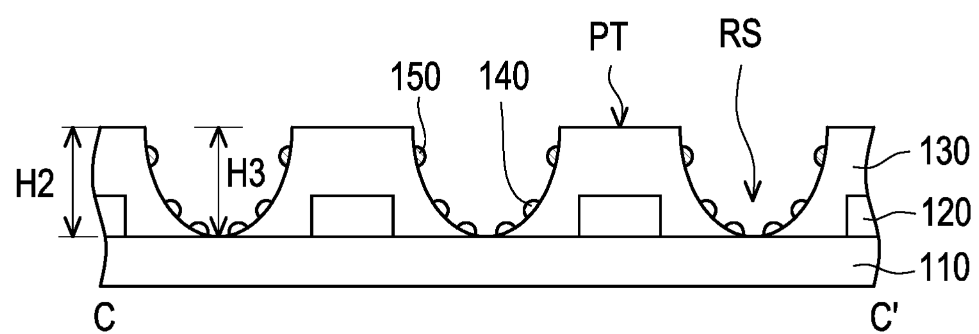
FIG. 3B is a cross-sectional schematic view along a section line C-C' of FIG. 3A.

FIG. 3A is a partial top schematic view of a light source module 30 according to an embodiment of the disclosure. FIG. 3B is a cross-sectional schematic view along a section line C-C' of FIG. 3A. Referring to FIG. 3A and FIG. 3B at the same time, the light source module includes: a circuit substrate 110, multiple light-emitting elements 120, a cover layer 130, and first scattering particles 140. The cover layer 130 has multiple recesses RS, and the first scattering particles 140 are located in the recesses RS.

Compared with the light source module 10 shown in FIG. 1A to FIG. 1B, the difference with the light source module 30 shown in FIG. 3A and FIG. 3B mainly lies in: the light source module 30 further includes reflective particles 150, and the reflective particles 150 are located in the recesses RS.

In this embodiment, the light transmittance of the first scattering particles 140 may be 10% to 100%, and the reflectance of the reflective particles 150 may be 10% to 100%. In some embodiments, the light transmittance of the first scattering particles 140 may be greater than the light transmittance of the reflective particles 150, for example, the light transmittance of the first scattering particles 140 may be greater than or equal to 50%, and the light transmittance of the reflective particles 150 may be less than 50%. The material of the reflective particles 150 may include organic polymer light-transmitting materials and/or opaque metals, the organic polymer light-transmitting materials are, for example, polyvinyl chloride (PVC), polycarbonate (PC), or polyethylene (PE), etc., and the opaque metals are, for example, aluminum or silver, etc., but not limited thereto. The reflective particles 150 may change the light output path of the light-emitting element 120, thereby partially reducing the light output of the light-emitting element 120.

In some embodiments, the distribution density of the reflective particles 150 may be inversely proportional to the spacing between the orthographic projections of the reflective particles 150 on the circuit substrate 110 and the orthographic projections of the light-emitting elements 120 on the circuit substrate 110. In other words, the reflective particles 150 may have a larger distribution density at a place closer horizontally to the light-emitting element 120, and the reflective particles 150 may have a smaller distribution density at a place farther horizontally from the light-emitting element 120. For example, in some embodiments, the reflective particles 150 may only be distributed around the protrusions PT, and no reflective particles 150 may be disposed at a place farther horizontally from the light-emitting element 120. In this way, the reflective particles 150 facilitate reducing the light output from the region above the light-emitting element 120.

In some embodiments, the distribution density of the first scattering particles 140 may be proportional to the spacing between the orthographic projections of the first scattering particles 140 on the circuit substrate 110 and the orthographic projections of the light-emitting elements 120 on the circuit substrate 110. In other words, the first scattering particles 140 may have a smaller distribution density at a place closer horizontally to the light-emitting element 120, and the first scattering particles 140 may have a larger distribution density at a place farther horizontally from the light-emitting element 120. For example, in some embodiments, the first scattering particles 140 may only be distributed in the region above non-light-emitting element 120, and the first scattering particles 140 may not be disposed on the region above the light-emitting elements 120 (such as the protrusions PT and their surroundings). In this way, the first scattering particles 140 facilitate increasing the light output from the region above non-light-emitting elements 120.

In some embodiments, the maximum depth H3 of the recess RS may be similar to or equal to the height H2 of the cover layer 130, so that the recess RS has a cross-sectional shape that is approximately U-shaped, and the reflective particles 150 may be distributed on the upper half sidewall of the recess RS, the first scattering particles 140 may be distributed on the lower half sidewall of the recess RS. In this way, the light output by the light source module 30 in the region directly above the light-emitting element 120 may be reduced by the reflective particles 150, and the light output by the light source module 30 in the region directly above non-light-emitting element 120 may be increased by the first scattering particles 140 at the same time, thereby improving the light emission uniformity of the light source module 30.

Figure 4A:
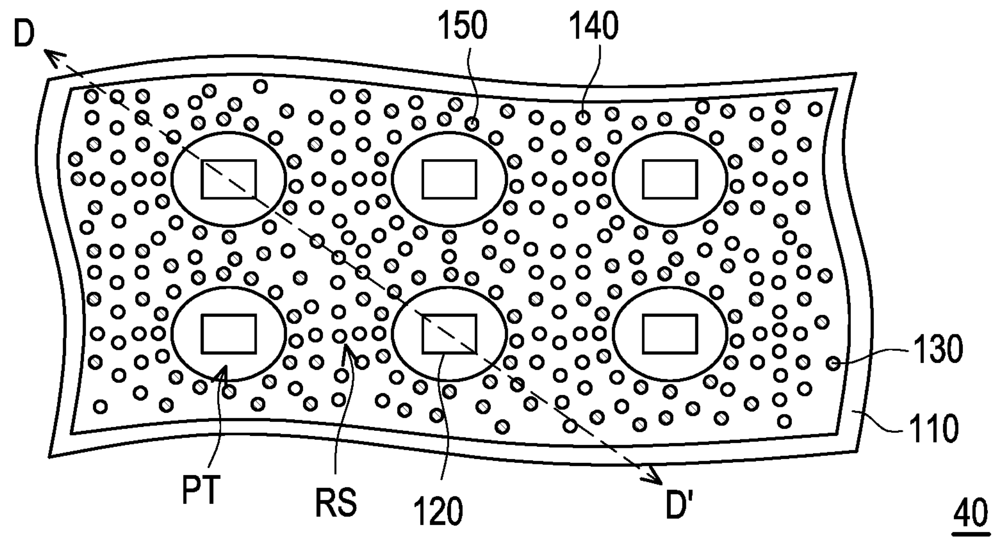
FIG. 4A is a partial top schematic view of a light source module 40 according to an embodiment of the disclosure.
Figure 4B:
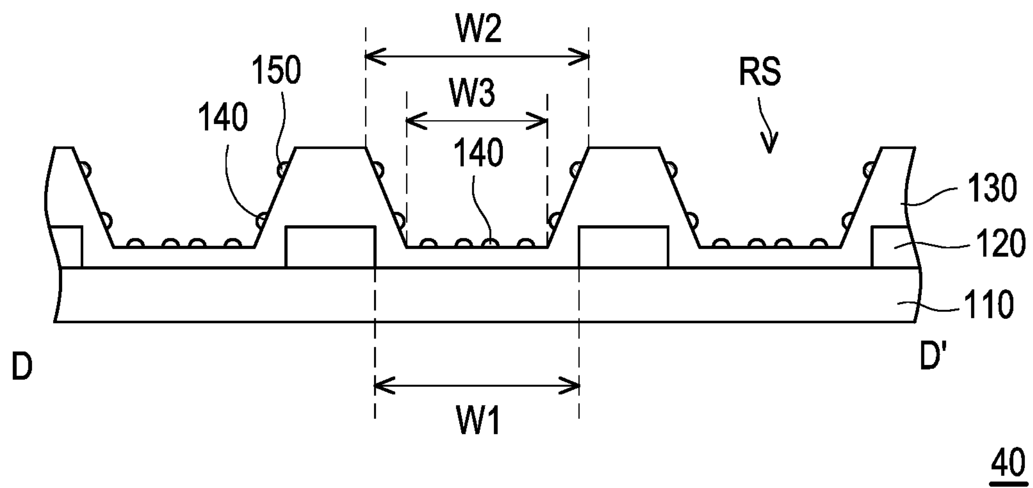
FIG. 4B is a cross-sectional schematic view along a section line D-D' of FIG. 4A.

FIG. 4A is a partial top schematic view of a light source module 40 according to an embodiment of the disclosure. FIG. 4B is a cross-sectional schematic view along a section line D-D' of FIG. 4A. Referring to FIG. 4A and FIG. 4B at the same time, the light source module 40 includes: a circuit substrate 110, multiple light-emitting elements 120, a cover layer 130, and first scattering particles 140. The cover layer 130 has multiple recesses RS, and the first scattering particles 140 are located in the recesses RS.

Compared with the light source module 30 shown in FIG. 3A to FIG. 3B, the difference with the light source module 40 shown in FIG. 4A and FIG. 4B mainly lies in: the recess RS of the light source module 40 has a cross-sectional shape that is trapezoidal with a wide top and a narrow bottom; and the orthographic projections of the recesses RS on the circuit substrate 110 partially overlap the orthographic projections of the light-emitting elements 120 on the circuit substrate 110.

For example, in this embodiment, there may be a spacing W1 between the light-emitting elements 120, the upper side of the recess RS may have a width W2, the lower side of the recess RS may have a width W3, and the width W3<the spacing W1<the width W2. In this way, a portion of the sidewall of the recess RS may be located in the region directly above the light-emitting element 120. In some embodiments, the maximum width W2 of the recess RS may be 10% to 140% of the spacing between the light-emitting elements 120.

In some embodiments, the reflective particles 150 may be located on the upper half sidewall of the recess RS, and the scattering particles 140 may be located on the lower half sidewall of the recess RS and the bottom surface of the recess RS. In this way, the reflective particles 150 may be located in the region directly above the light-emitting element 120, so as to reduce the light output in the region directly above the light-emitting element 120, and the scattering particles 140 may increase the light output in the region directly above non-light-emitting element 120, thereby improving the overall light emission uniformity of the light source module 40. In some embodiments, the depth of the recess RS is less than the height of the cover layer 130, so that the cover layer 130 exists between the scattering particles 140 located on the bottom surface of the recess RS and the circuit substrate 110.

Figure 5A:
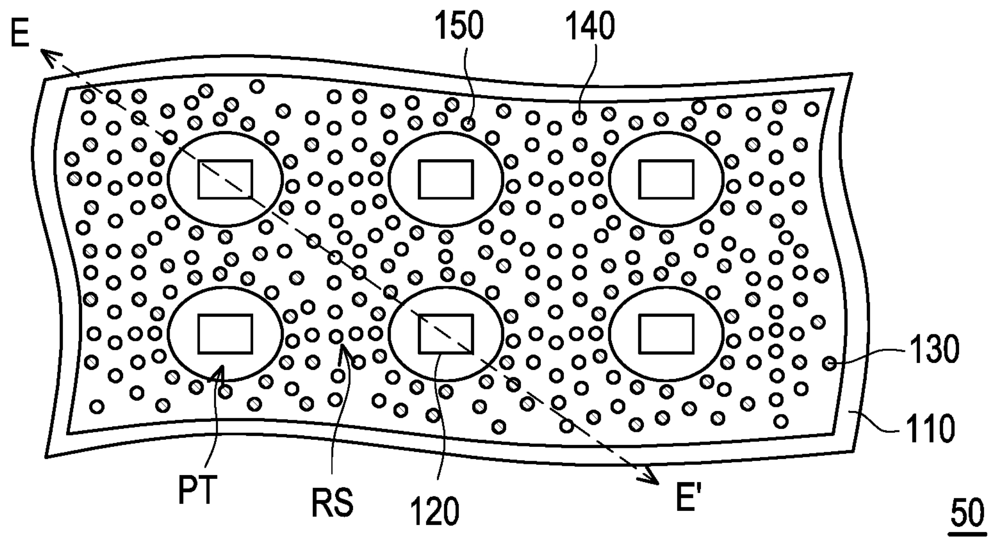
FIG. 5A is a partial top schematic view of a light source module 50 according to an embodiment of the disclosure.
Figure 5B:
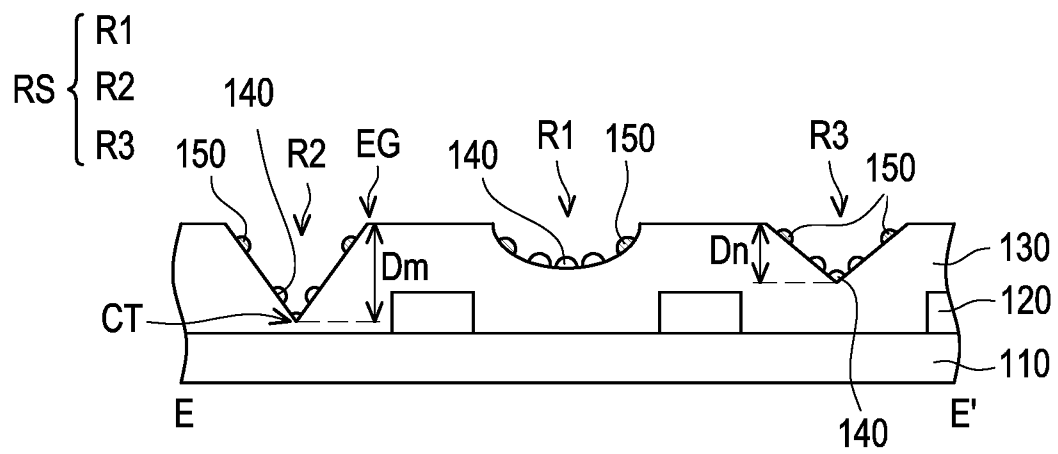
FIG. 5B is a cross-sectional schematic view along a section line E-E' of FIG. 5A.

FIG. 5A is a partial top schematic view of a light source module 50 according to an embodiment of the disclosure. FIG. 5B is a cross-sectional schematic view along a section line E-E' of FIG. 5A. Referring to FIG. 5A and FIG. 5B at the same time, the light source module 50 includes: a circuit substrate 110, multiple light-emitting elements 120, a cover layer 130, first scattering particles 140, and reflecting particles 150. The cover layer 130 has multiple recesses RS, and the first scattering particles 140 and the reflecting particles 150 are located in the recesses RS.

Compared with the light source module 30 shown in FIG. 3A to FIG. 3B, the difference with the light source module 50 shown in FIG. 5A and FIG. 5B mainly lies in: the cover layer 130 of the light source module 50 has recesses RS with various cross-sectional shapes. For example, in this embodiment, the recesses RS may include a first recess R1, a second recess R2, and a third recess R3, and the cross-sectional shapes of the first recess R1 and the second recess R2 are different. For example, the first recess R1 may have a cross-sectional shape that is arc-shaped, and the second recess R2 and the third recess R3 may have a cross-sectional shape that is V-shaped.

In some embodiments, the second recess R2 has a maximum depth at its center CT, and the second recess R2 has a minimum depth at its edge EG, and along the direction from the center CT to the edge EG, as the spacing between the recess RS and the light-emitting element 120 decreases, the depth of the recess RS also decreases. In other words, the depth of each place in the recess RS may be proportional to the spacing between each place in the recess RS and the light-emitting element 120.

In some embodiments, the maximum depth Dm of the second recess R2 is greater than the maximum depth Dn of the third recess R3, so that the second recess R2 may provide more compensated light output than the third recess R3. Therefore, the second recesses R2 may be disposed in the peripheral region of the light source module 50, and the third recesses R3 may be disposed in the central region of the light source module 50, so that the brightness of the peripheral region of the light source module 50 is similar to or equal to that of the central region. In other words, the depth of each recess RS may be proportional to the spacing between each recess RS and the center of the light source module 50.

Figure 6A:
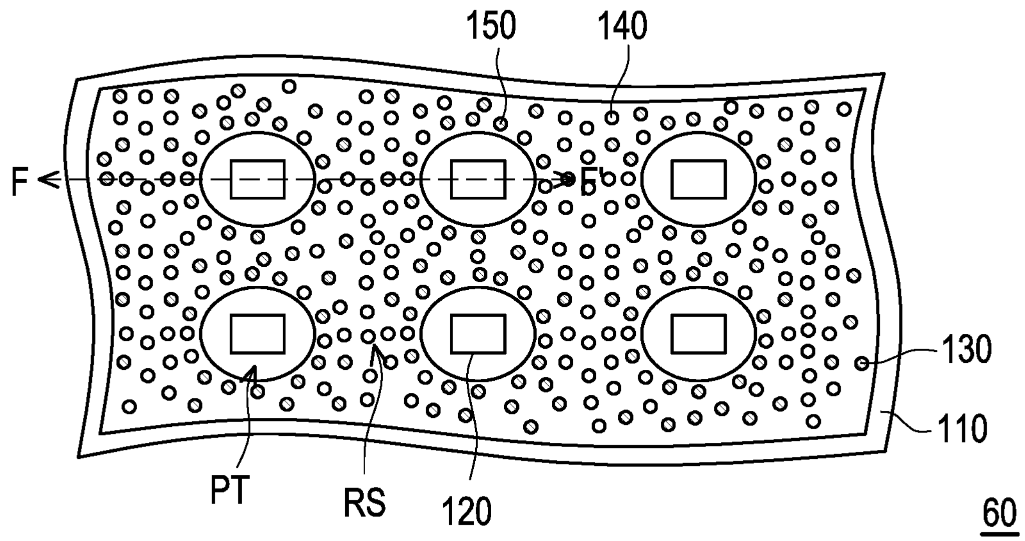
FIG. 6A is a partial top schematic view of a light source module 60 according to an embodiment of the disclosure.
Figure 6B:
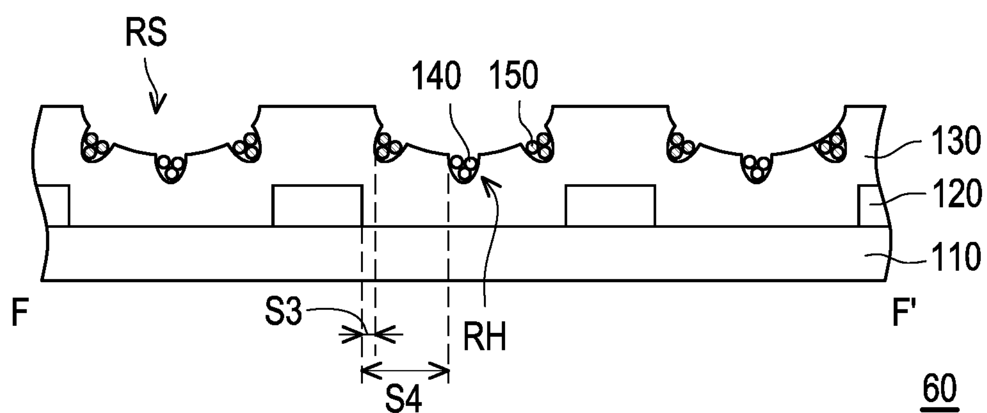
FIG. 6B is a cross-sectional schematic view along a section line F-F' of FIG. 6A.

FIG. 6A is a partial top schematic view of a light source module 60 according to an embodiment of the disclosure. FIG. 6B is a cross-sectional schematic view along a section line F-F' of FIG. 6A. Referring to FIG. 6A and FIG. 6B at the same time, the light source module 60 includes: a circuit substrate 110, multiple light-emitting elements 120, a cover layer 130, first scattering particles 140, and reflecting particles 150. The cover layer 130 has multiple recesses RS, and the first scattering particles 140 and the reflecting particles 150 are located in the recesses RS.

Compared with the light source module 30 shown in FIG. 3A to FIG. 3B, the difference with the light source module 60 shown in FIG. 6A and FIG. 6B mainly lies in: the recesses RS of the cover layer 130 of the light source module 60 also have multiple recessed holes RH, and the recessed holes RH may be formed by recessing the upper surface of the cover layer 130 in the recesses RS. Therefore, generally speaking, the radius of curvature of the recessed hole RH is less than the radius of curvature of the recess RS.

In some embodiments, the first scattering particles 140 may be located in the recessed holes RH, so the particle diameter of the first scattering particles 140 may be smaller than the diameter of the recessed hole RH. In some embodiments, the reflective particles 150 may be located in the recessed hole RH, so the particle diameter of the reflective particles 150 may be smaller than the diameter of the recessed hole RH. In some embodiments, the spacing S3 between the orthographic projections of the reflective particles 150 in the recessed holes RH on the circuit substrate 110 and the orthographic projections of the light-emitting elements 120 on the circuit substrate 110 may be less than the spacing S4 between the orthographic projections of the first scattering particles 140 in the recessed holes RH on the circuit substrate 110 and the orthographic projections of the light-emitting elements 120 on the circuit substrate 110.

Figure 7A:
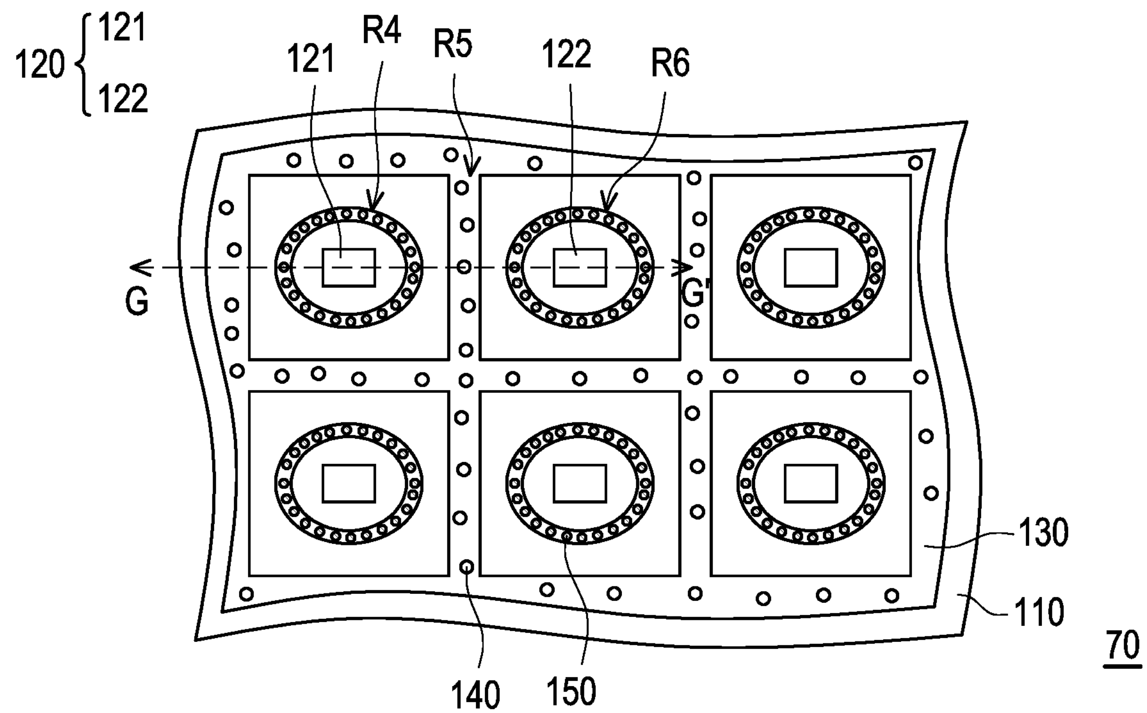
FIG. 7A is a partial top schematic view of a light source module 70 according to an embodiment of the disclosure.
Figure 7B:
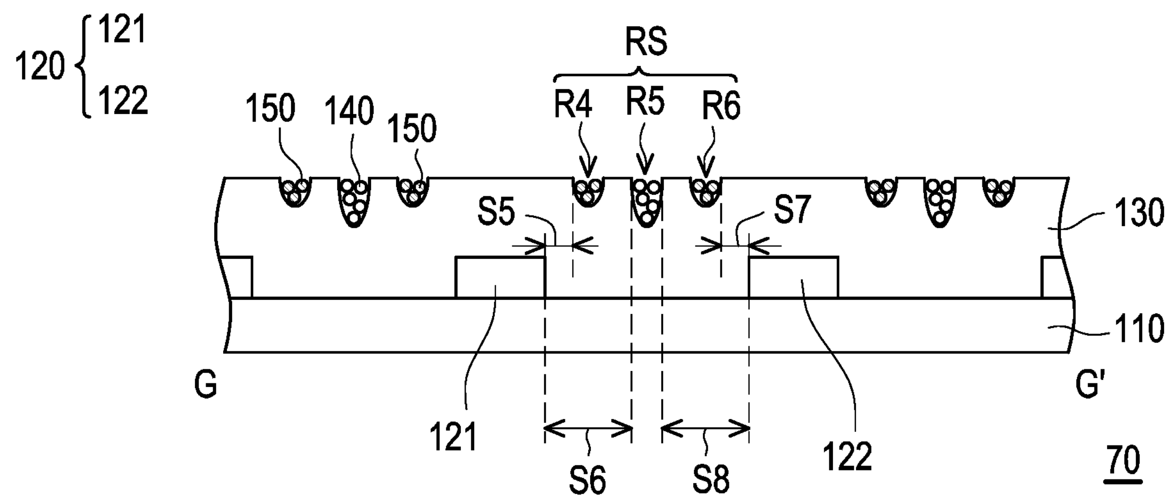
FIG. 7B is a cross-sectional schematic view along a section line G-G' of FIG. 7A.

FIG. 7A is a partial top schematic view of a light source module 70 according to an embodiment of the disclosure. FIG. 7B is a cross-sectional schematic view along a section line G-G' of FIG. 7A. Referring to FIG. 7A and FIG. 7B at the same time, the light source module includes: a circuit substrate 110, multiple light-emitting elements 120, a cover layer 130, first scattering particles 140, and reflecting particles 150. The cover layer 130 has multiple recesses RS, and the first scattering particles 140 and the reflecting particles 150 are located in the recesses RS.

Compared with the light source module 30 shown in FIG. 3A to FIG. 3B, the difference with the light source module 70 shown in FIG. 7A and FIG. 7B mainly lies in: the orthographic projections of at least two of the recesses RS of the cover layer 130 of the light source module 70 on the circuit substrate 110 overlaps the circuit substrate 110 between adjacent light-emitting elements 120.

For example, in this embodiment, the light-emitting elements 120 may include adjacent light-emitting elements 121 and 122, the recesses RS may include a fourth recess R4, a fifth recess R5, and a sixth recess R6, and a portion of the fourth recess R4, a portion of the fifth recess R5, and a portion of the sixth recess R6 may be located between the adjacent light-emitting elements 121 and 122.

In some embodiments, referring to the partial top view of the light source module 70 shown in FIG. 7A, both the fourth recess R4 and the sixth recess R6 have a top view shape that is ring-shaped, the fourth recess R4 may surround the light-emitting element 121, and the sixth recess R6 may surround the light-emitting element 122. In addition, the fifth recess R5 may have a top view that is grid-shaped, and both the fourth recess R4 and the sixth recess R6 are respectively located in the grid of the fifth recess R5. In this embodiment, the top view shape of the fifth recess R5 is a square grid, but the disclosure is not limited thereto. In some embodiments, the top view shape of the fifth recess R5 may be a polygonal grid.

In some embodiments, the spacing S5 between the orthographic projection of the fourth recess R4 on the circuit substrate 110 and the orthographic projection of the light-emitting element 121 on the circuit substrate 110 is less than the spacing S6 between the orthographic projection of the fifth recess R5 on the circuit substrate 110 and the orthographic projection of the light-emitting element 121 on the circuit substrate 110, the spacing S7 between the orthographic projection of the sixth recess R6 on the circuit substrate 110 and the orthographic projection of the light-emitting element 122 on the circuit substrate 110 is less than the spacing S8 between the orthographic projection of the fifth recess R5 on the circuit substrate 110 and the orthographic projection of the light-emitting element 122 on the circuit substrate 110. The depth of the fourth recess R4 is less than the depth of the fifth recess R5, and the depth of the sixth recess R6 is less than the depth of the fifth recess R5. In other words, as the horizontal spacing with the light-emitting element 120 increases, the fifth recess R5 may have a greater depth. Therefore, the depths of the fourth recess R4, the fifth recess R5, and the sixth recess R6 may be respectively proportional to the spacing between the respective recess and the orthographic projections of the light-emitting elements 120 on the circuit substrate 110.

In some embodiments, the reflective particles 150 may be disposed in the fourth recess R4 and the sixth recess R6, and the first scattering particles 140 may be disposed in the fifth recess R5, but the disclosure is not limited thereto.

Figure 8A:
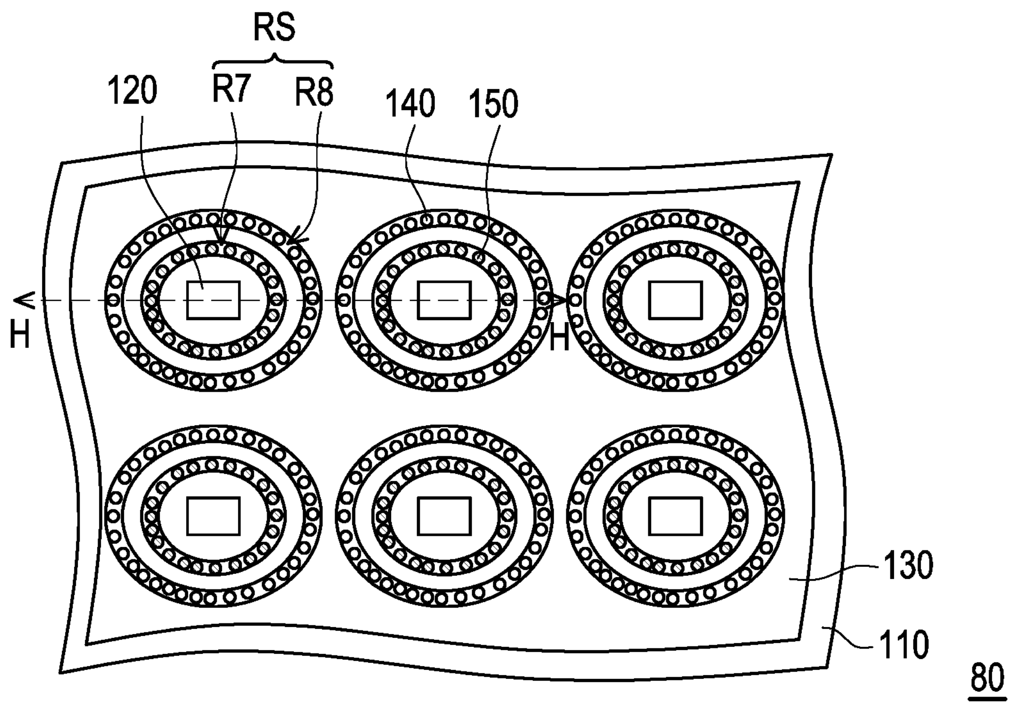
FIG. 8A is a partial top schematic view of a light source module 80 according to an embodiment of the disclosure.
Figure 8B:
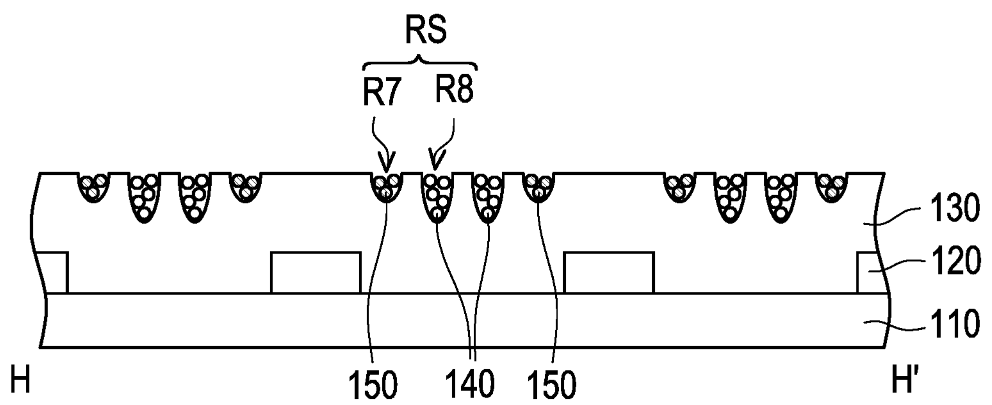
FIG. 8B is a cross-sectional schematic view along a section line H-H' of FIG. 8A.

FIG. 8A is a partial top schematic view of a light source module 80 according to an embodiment of the disclosure. FIG. 8B is a cross-sectional schematic view along a section line H-H' of FIG. 8A. Referring to FIG. 8A and FIG. 8B at the same time, the light source module includes: a circuit substrate 110, multiple light-emitting elements 120, a cover layer 130, first scattering particles 140, and reflecting particles 150. The cover layer 130 has multiple recesses RS, and the first scattering particles 140 and the reflecting particles 150 are located in the recesses RS.

Compared with the light source module 70 shown in FIG. 7A to FIG. 7B, the difference with the light source module 80 shown in FIG. 8A and FIG. 8B mainly lies in: the recesses RS of the cover layer 130 of the light source module 80 may include a seventh recess R7 and an eighth recess R8, and the orthographic projection of the seventh recess R7 on the circuit substrate 110 may be located between the orthographic projections of the light-emitting elements 120 on the circuit substrate 110 and the orthographic projection of the eighth recess R8 on the circuit substrate 110. In some embodiments, the seventh recess R7 or the eighth recess R8 may be formed by multiple grooves not connected to each other. In some embodiments, the recess RS may include a seventh recess R7 that is ring-shaped and an eighth recess R8 that is ring-shaped, the seventh recess R7 may surround the light-emitting element 120, the eighth recess R8 may surround the seventh recess R7, and a portion of the seventh recess R7 and a portion of the eighth recess R8 may be located between adjacent light-emitting elements 120. In some embodiments, the seventh recess R7 and the eighth recess R8 may be closed ring-shaped grooves.

In some embodiments, the reflective particles 150 may be disposed in the seventh recess R7, and the first scattering particles 140 may be disposed in the eighth recess R8, but the disclosure is not limited thereto. In some embodiments, the first scattering particles 140 may be disposed in the seventh recess R7, and the reflective particles 150 may be disposed in the eighth recess R8. In other embodiments, both the first scattering particles 140 and the reflective particles 150 may be disposed in the seventh recess R7 and the eighth recess R8, but the amount of the first scattering particles 140 in the seventh recess R7 is less than the amount of the reflective particles 150, and the amount of first scattering particles 140 is greater than the amount of reflective particles 150 in the eighth recess R8.

Figure 9:
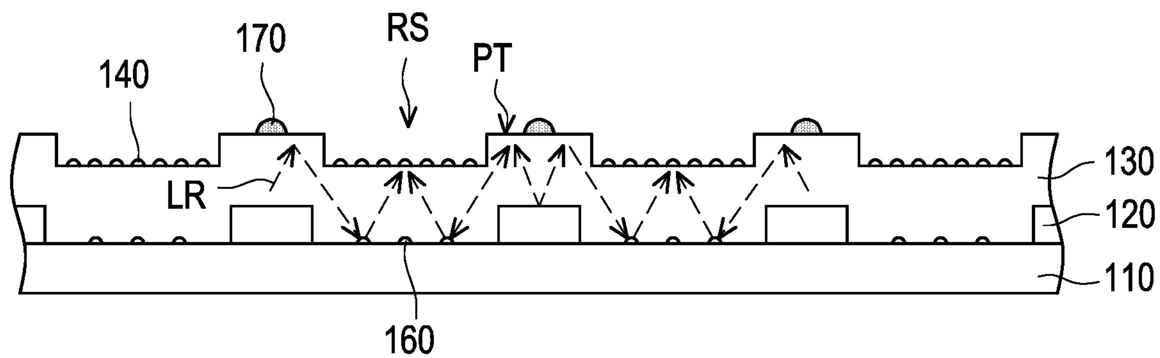
FIG. 9 is a partial cross-sectional schematic view of a light source module 90 according to an embodiment of the disclosure.

FIG. 9 is a partial cross-sectional schematic view of a light source module 90 according to an embodiment of the disclosure. The light source module 90 includes: a circuit substrate 110, multiple light-emitting elements 120, a cover layer 130, and first scattering particles 140. The cover layer 130 has multiple recesses RS and a multiple protrusions PT, and the first scattering particles 140 are located in the recesses RS.

Compared with the light source module 10 shown in FIGS. 1A to 1B, the difference with the light source module 90 shown in FIG. 9 mainly lies in: the recesses RS of the cover layer 130 of the light source module 90 may have a cross-sectional shape that is a rectangle, and the light source module 90 further includes auxiliary particles 160. The auxiliary particles 160 may be located on the circuit substrate 110 between the light-emitting elements 120. The material and properties of the auxiliary particles 160 may be similar to those of the reflective particles 150, and are not repeated herein.

In some embodiments, the light source module 90 may further include multiple reflective particles 170, and the reflective particles 170 may be located on the protrusions PT, so that a portion of the light beam LR emitted by the light-emitting elements 120 may be reflected by the reflective particles 170 to the auxiliary particles 160. Afterwards, the light is scattered by the auxiliary particles 160 and the first scattering particles 140 and emitted from the recesses RS. The material and properties of the reflective particles 170 may be similar to those of the reflective particles 150, and are not repeated herein. In this way, it is possible to slightly reduce the light output from the protrusions PT and at the same time slightly increase the light output from the recesses RS, thereby improving the light emission uniformity of the light source module 90.

Figure 10:
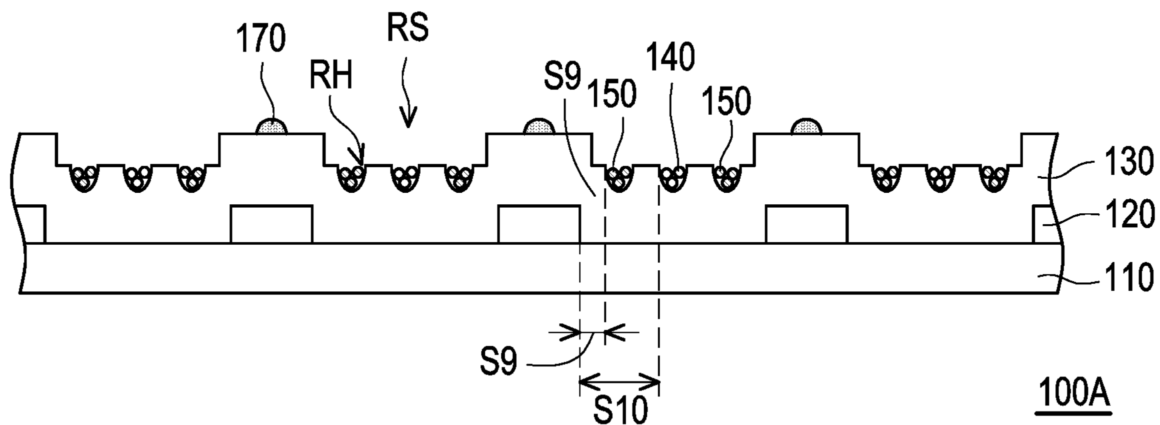
FIG. 10 is a partial cross-sectional schematic view of a light source module 100A according to an embodiment of the disclosure.

FIG. 10 is a partial cross-sectional schematic view of a light source module 100A according to an embodiment of the disclosure. The light source module 100A includes: a circuit substrate 110, multiple light-emitting elements 120, a cover layer 130, and first scattering particles 140. The cover layer 130 has multiple recesses RS, and the first scattering particles 140 are located in the recesses RS. Compared with the light source module 90 shown in FIG. 9, the difference with the light source module 100B shown in FIG. 10 mainly lies in: the recesses RS of the cover layer 130 of the light source module 100B also has multiple recessed holes RH. In some embodiments, the first scattering particles 140 may be located in the recessed holes RH. In some embodiments, the light source module 100A further includes reflective particles 150, the reflective particles 150 may be located in the recessed holes RH, and the spacing between the orthographic projections of the reflective particles 150 on the circuit substrate 110 and the orthographic projections of the light-emitting elements 120 on the circuit substrate 110 is less than the spacing between the orthographic projections of the first scattering particles 140 on the circuit substrate 110 and the orthographic projections of the light-emitting elements 120 on the circuit substrate 110. For example, the spacing S9 between the orthographic projections of the recessed holes RH where the reflective particles 150 are located on the circuit substrate 110 and the orthographic projections of the light-emitting elements 120 on the circuit substrate 110 may be less than the spacing S10 between the orthographic projections of the recessed holes RH where the first scattering particles 140 are located on the circuit substrate 110 and the orthographic projections of the light-emitting elements 120 on the circuit substrate 110.

Figure 11:
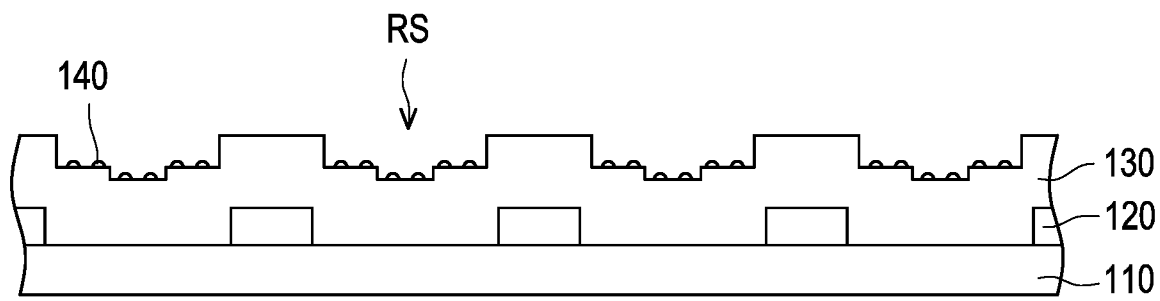
FIG. 11 is a partial cross-sectional schematic view of a light source module 100B according to an embodiment of the disclosure.

FIG. 11 is a partial cross-sectional schematic view of a light source module 100B according to an embodiment of the disclosure. The light source module 100B includes: a circuit substrate 110, multiple light-emitting elements 120, a cover layer 130, and first scattering particles 140. The cover layer 130 has multiple recesses RS, and the first scattering particles 140 are located in the recesses RS. Compared with the light source module 10 shown in FIG. 1A to FIG. 1B, the difference with the light source module 100B shown in FIG. 11 mainly lies in: the recesses RS of the cover layer 130 of the light source module 100B has a cross-sectional shape that is stepped.

Figure 12:
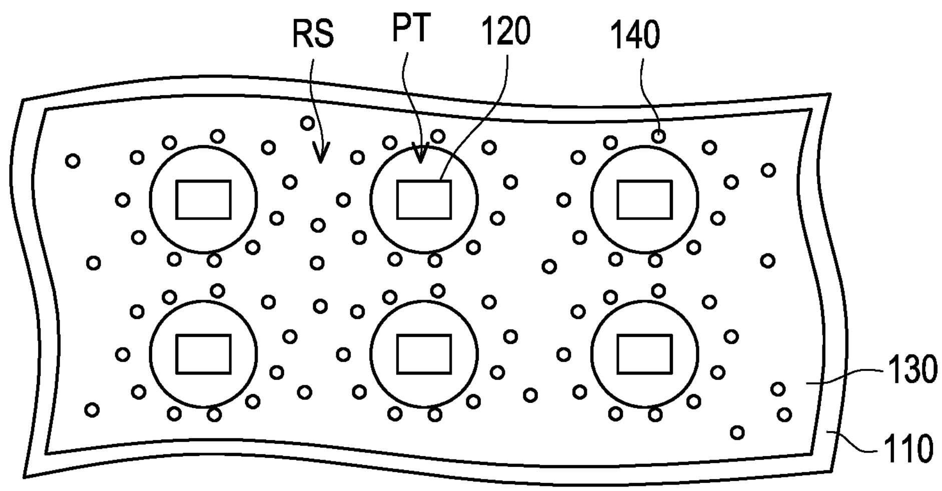
FIG. 12 is a partial top schematic view of a light source module 100C according to an embodiment of the disclosure.

FIG. 12 is a partial top schematic view of a light source module 100C according to an embodiment of the disclosure. The light source module 100C includes: a circuit substrate 110, multiple light-emitting elements 120, a cover layer 130, and first scattering particles 140. The cover layer 130 has multiple recesses RS and a multiple protrusions PT, and the first scattering particles 140 are located in the recesses RS. Compared with the light source module 10 shown in FIG. 1A to FIG. 1B, the difference with the light source module 100C shown in FIG. 12 mainly lies in: the protrusions PT of the cover layer 130 of the light source module 100C has a top view shape that is circular.

Figure 13:
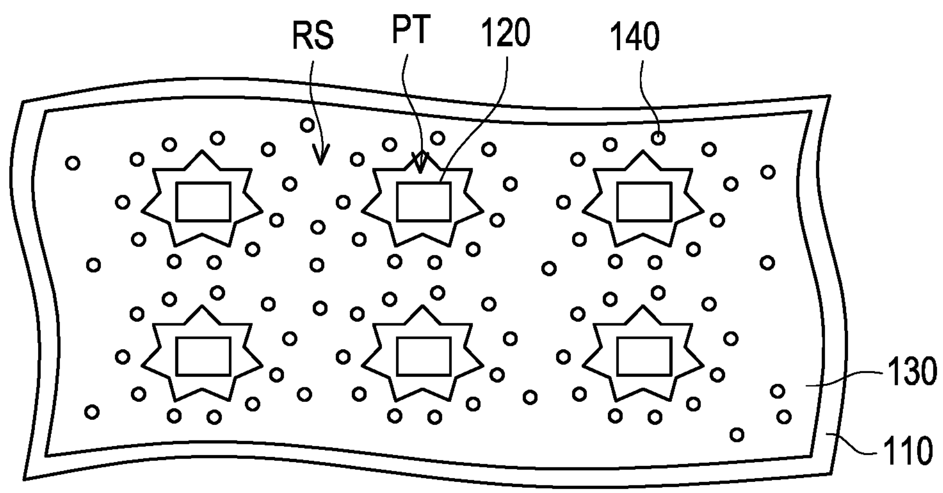
FIG. 13 is a partial top schematic view of a light source module 100D according to an embodiment of the disclosure.

FIG. 13 is a partial top schematic view of a light source module 100D according to an embodiment of the disclosure. The light source module 100D includes: a circuit substrate 110, multiple light-emitting elements 120, a cover layer 130, and first scattering particles 140. The cover layer 130 has multiple recesses RS and a multiple protrusions PT, and the first scattering particles 140 are located in the recesses RS. Compared with the light source module 10 shown in FIG. 1A to FIG. 1B, the difference with the light source module 100D shown in FIG. 13 mainly lies in: the protrusions PT of the cover layer 130 of the light source module 100D has a top view shape that is star-shaped.

Figure 14:
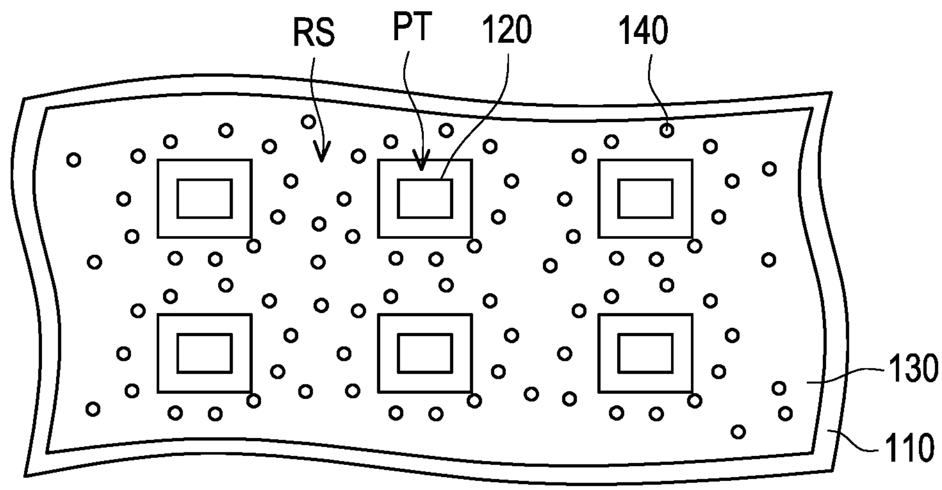
FIG. 14 is a partial top schematic view of a light source module 100E according to an embodiment of the disclosure.

FIG. 14 is a partial top schematic view of a light source module 100E according to an embodiment of the disclosure. The light source module 100E includes: a circuit substrate 110, multiple light-emitting elements 120, a cover layer 130, and first scattering particles 140. The cover layer 130 has multiple recesses RS and a multiple protrusions PT, and the first scattering particles 140 are located in the recesses RS. Compared with the light source module 10 shown in FIG. 1A to FIG. 1B, the difference with the light source module 100E shown in FIG. 14 mainly lies in: the protrusions PT of the cover layer 130 of the light source module 100E has a top view shape that is polygonal, for example, the protrusions PT may have a top view shape that is rectangular.

Figure 15:
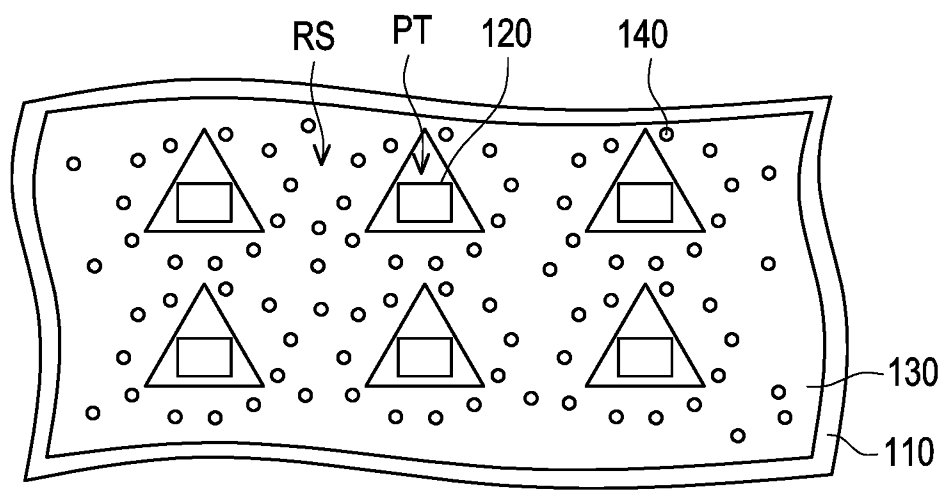
FIG. 15 is a partial top schematic view of a light source module 100F according to an embodiment of the disclosure.

FIG. 15 is a partial top schematic view of a light source module 100F according to an embodiment of the disclosure. The light source module 100F includes: a circuit substrate 110, multiple light-emitting elements 120, a cover layer 130, and first scattering particles 140. The cover layer 130 has multiple recesses RS and a multiple protrusions PT, and the first scattering particles 140 are located in the recesses RS. Compared with the light source module 10 shown in FIG. 1A to FIG. 1B, the difference with the light source module 100F shown in FIG. 15 mainly lies in: the protrusions PT of the cover layer 130 of the light source module 100F has a top view shape that is a regular polygon, for example, the protrusions PT may have a top view shape that is an equilateral triangle.

To sum up, the light source module of the disclosure may adjust the light output distribution of the light source module by disposing recesses on the cover layer and disposing the first scattering particles in the recesses. In addition, in the light source module of the disclosure, by suitably changing the particle diameter distribution and/or the distribution density of the first scattering particles, or by suitably changing the shape, depth and/or number of the recesses, or by disposing reflective particles in the recesses and/or on the protrusions, or by disposing auxiliary particles in the cover layer, the light output distribution of the light source module may be partially finely adjusted, so that the light source module may have ideal light emission uniformity.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A light source module, comprising:
a circuit substrate;
a plurality of light-emitting elements, disposed on the circuit substrate;
a cover layer, covering the light-emitting elements, and an upper surface of the cover layer having multiple recesses, wherein orthographic projections of the recesses on the circuit substrate overlap the circuit substrate between the light-emitting elements; and
a plurality of first scattering particles, located in the recesses,
wherein the cover layer further has a plurality of protrusions located between the recesses, and orthographic projections of the protrusions on the circuit substrate respectively overlap orthographic projections of the light-emitting elements on the circuit substrate.

2. The light source module according to claim 1, wherein a particle diameter distribution of the first scattering particles is proportional to a spacing between orthographic projections of the first scattering particles on the circuit substrate and the orthographic projections of the light-emitting elements on the circuit substrate.

3. The light source module according to claim 1, wherein a distribution density of the first scattering particles is proportional to a spacing between orthographic projections of the first scattering particles on the circuit substrate and the orthographic projections of the light-emitting elements on the circuit substrate.

4. The light source module according to claim 1, wherein the orthographic projections of the recesses on the circuit substrate partially overlap the orthographic projections of the light-emitting elements on the circuit substrate.

5. The light source module according to claim 1, wherein orthographic projections of at least two of the recesses on the circuit substrate overlap the circuit substrate between adjacent light-emitting elements.

6. The light source module according to claim 5, wherein depths of the at least two recesses are respectively proportional to a spacing between the at least two recesses and the orthographic projections of the light-emitting elements on the circuit substrate.

7. The light source module according to claim 1, further comprising reflective particles located in the recesses.

8. The light source module according to claim 7, wherein light transmittance of the first scattering particles is greater than light transmittance of the reflective particles.

9. The light source module according to claim 7, wherein a distribution density of the reflective particles is inversely proportional to a spacing between orthographic projections of the reflective particles on the circuit substrate and the orthographic projections of the light-emitting elements on the circuit substrate.

10. The light source module according to claim 1, wherein the recesses further respectively have a plurality of recessed holes.

11. The light source module according to claim 10, further comprising reflective particles located in multiple recessed holes.

12. The light source module according to claim 1, wherein the first scattering particles are not overlapped with the light-emitting elements.

13. The light source module according to claim 1, a depth of the recesses is 10% to 100% of a height of the cover layer.

14. The light source module according to claim 1, wherein a maximum width of the recesses is 10% to 140% of a spacing between the light-emitting elements.

15. The light source module according to claim 1, further comprising auxiliary particles located on the circuit substrate between the light-emitting elements.

16. The light source module according to claim 1, wherein the orthographic projections of the recesses on the circuit substrate are outside the orthographic projections of the light-emitting elements on the circuit substrate.

17. The light source module according to claim 1, further comprising reflective particles located on the protrusions.

18. The light source module according to claim 1, wherein cross-sectional shapes of a first recess and a second recess of the recesses are different.

19. The light source module according to claim 1, wherein a minimum spacing between the recesses and the circuit substrate is greater than or equal to a maximum spacing between a top surface of the light-emitting elements and the circuit substrate.

20. The light source module according to claim 1, wherein the recesses have top view shapes that are ring-shaped or grid-shaped.

* * * * *